R. T. OSGOOD.
Harvester-Rake.
No. { 148, / 1,251. }
Reissued Dec. 24, 1861
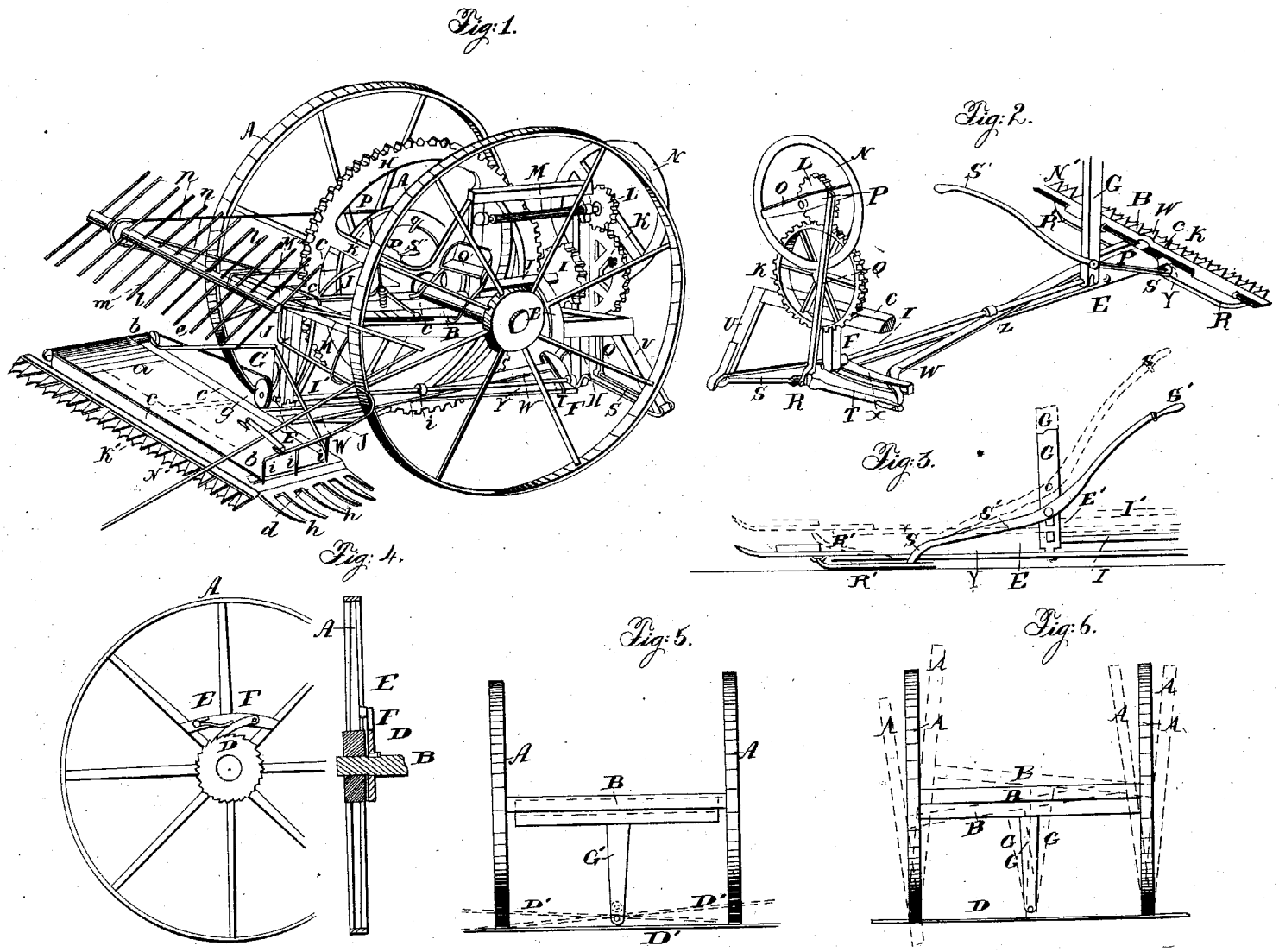
N. PETERS, PHOTO-LITHOGRAPHER, WASHINGTON, D. C.

UNITED STATES PATENT OFFICE.

CYRENUS WHEELER, JR., OF POPLAR RIDGE, NEW YORK, ASSIGNEE OF ROBERT T. OSGOOD.

IMPROVEMENT IN GRAIN AND GRASS HARVESTERS.

Specification forming part of Letters Patent No. 8,743 dated February 17, 1852; Reissue No. 1,251, dated December 24, 1861.

*To all whom it may concern:*

Be it known that ROBERT T. OSGOOD, of Orland, in the county of Hancock and State of Maine, did invent certain new and useful Improvements in Machines for Harvesting Grain, Mowing Grass, &c.; and I do hereby declare that the following is a full, clear, and exact description of the same, reference being had to the accompanying drawings, making a part of this specification, in which—

Figure 1 represents a perspective view of the machine. Fig. 2 represents a perspective view of the cutting apparatus and its more immediate operative parts detached from the other parts of the machine. Fig. 3 represents detached from the machine the cutting apparatus and the shoe and lever by which it may be raised or lowered as circumstances may require. Fig. 4 represents a side view and vertical section of one of the driving and supporting wheels to show the pawl-and-ratchet arrangement thereon. Figs. 5 and 6 represent a pair of wheels and axle and lines, dotted and otherwise, to show how the wheels and the cutter-bar may have motions or positions without influencing the motions or positions of the other.

Similar letters of reference, where they occur in the separate figures, denote like parts in all of them.

In the construction of a grain and grass harvester known as a "combined reaper and mower" there are many separate features that must be adaptable to both reaping and mowing, the conditions of each operation varying with the material to be cut and the nature of the ground over which the machine is to be operated.

In cutting grain the cutters are raised some distance above the ground, and to the cutters an addition of some device is necessary for receiving the cut grain and delivering it in proper shape for binding into sheaves.

In cutting grass it is desirable that the cut material should be left spread on the ground for the purpose of drying and curing it. To do so the grain-receptacle should be so made and attached as to be readily and easily removable, and the cutting apparatus should be capable of being brought close to so as to travel on or near the ground, conforming as nearly as possible to its surface, and while thus conforming to the surface of the ground the cutters should vibrate with nearly uniform motion, whether the machine is moving in a direct line or on a curve to the right or left.

To construct such a machine as is adaptable both to the reaping of grain and mowing of grass, and be susceptible of the necessary adjustments for each separate purpose, constitutes the general characteristics of this invention, the separate divisions of which will be fully described hereinafter under their distinctive and appropriate heads, some branches of which will form the subject-matter for separate Letters Patent.

It is obvious that several parts of the within-described improvements are equally as applicable to the various other reaping and mowing machines in use as to that more particularly herein shown or described.

One mode of applying each of these improvements to practical use is shown in the drawings. It is therefore unnecessary to specify the manner of applying the parts, respectively, to other machines, as the ordinary skill of a constructer is sufficient for the purpose.

In mowing grass, if cut too high from the ground a loss is occasioned by the diminished yield of hay; if cut too close, great injury will be done by the heat of the sun to the exposed ground or roots of the grass, causing comparative barrenness the following year; and if cut irregularly a compound loss of hay and injury to the meadow is incurred. A skillful man with the scythe can cut grass with a good degree of uniformity; but his progress must necessarily be slow and his work laborious, and as time is more valuable in the harvest than in other seasons of the year this mode of harvesting grass is very expensive.

Machines have been constructed that will cut grass with a good degree of evenness on comparatively smooth land; but as heretofore constructed they have not carried their cutting apparatus in a way that left it free enough to conform to the surface of uneven ground, and as but little of the ground used for meadow has a plane surface, and a large proportion thereof is rolling and uneven, their use on such land has been very limited, and when used it has been under great disadvantages.

To adapt a harvesting-machine to the mowing of grass in a proper and economical manner on rolling or uneven ground, it is desirable that the finger-beam and cutters, as they pass over the ground, should follow closely the surface, conforming freely to the undulations thereof, rising and falling in its entire length, or at either end, independent of its other end, according to the varying inclinations of the surface of the ground, so that the cutting apparatus shall at all times run as nearly parallel with the surface of the ground as possible, and as close thereto as the condition of the crop, the nature of the ground, and the safety of the cutters will permit. As the beam that carries the cutters must receive its progressive movements over the ground by means of the main frame, its connection therewith must be such that, while it receives its progressive movement therefrom, it will receive its vertical movement from the ground over which it passes, freely rising or falling in its entire length, or at either end, independent of and without elevating or depressing its other end, and uninfluenced by the motion of the main wheels or main frame, except to advance it over the ground.

For the cutting apparatus to operate effectively it is important that the motions of the cutters be kept up with great uniformity, as any cessation of their vibration during the progressive movement of the beam over the ground would either clog them or cause a balk, and as the character of the land and shape of the fields will make it frequently necessary to operate the cutters when the machine is moving around curves to the right or to the left, provision should be made to get this uniform motion of cutter through all these conditions, and in getting this uniform motion of cutter care must be taken that the easy turning of the machine to change its direction is not impaired.

When a cutting apparatus is driven from one of the supporting-wheels it will vibrate with sufficient motion if such driving-wheel have sufficient weight, and so long as the machine is moving in a direct line, and the team can change the direction of the machine without undue effort when one wheel only acts to drive the cutting apparatus; but in changing the direction of the machine so as to move on a curve that will bring the driving-wheel to nearly if not quite a full stop, that end of the cutting apparatus farthest from it will continue to move forward, crowding the cutters with grass, while the cutters, not having sufficient vibration to sever the grass properly, will either become clogged or occasion a balk—a difficulty that would be more serious in a finger-beam that is free to conform to the uneven ground than in a rigid-bar machine, from the fact that if the vibrations of the cutter ceased when the finger-beam was rising an abrupt inclination of the ground the tendency of the uncut grass would be to cause the cutting apparatus to hug the ground so closely as to carry the cutters into the ground, instead of permitting them to rise over the elevations.

To operate a machine in a proper manner the cutting apparatus should not only be free to conform to the ground over which it passes, but the vibratory motion of the cutters should be kept up whether the machine is turning to the right or left as well as when moving in a direct line.

To overcome the difficulties mentioned and to secure the results desired is the object of this branch of the aforesaid invention; and the nature of the invention consists in the combination, with the main frame of a grain or grass harvester, of two independent driving-wheels and a hinged cutting apparatus, whereby the cutters are kept in operation when the machine is turned either to the right or left, while the cutting apparatus, or either end thereof, is free to conform to the irregularities of the ground independent of the up-and-down motion of the driving-wheels.

As this machine is intended to operate on uneven ground and on fields of irregular form, it is necessary not only that the finger-beam should follow the ground, and that the motion of the cutters should at all times be kept up, but that the machine should be steadied laterally, and the driver should be in a position to ride upon the main frame and direct or guide the team, while his seat and the gearing that operates the cutters should be so arranged that while both are mounted on the main frame and carried forward by the driving and supporting wheels they shall add by their weight to the traction force of the driving-wheels, giving them greater power to drive the cutters by or with.

To secure the above desirable results is the object of this branch of the aforesaid invention; and the nature of the invention consists in the combination of the following elements in a grain or grass harvester, viz: a tongue to draw and steady the machine by, a frame to support and carry the driver and gearing, two independent driving and bearing or supporting wheels to carry the frame and give motion to the cutters, and a short finger-beam so hinged to the main frame that its progressive movement over the ground will be controlled by the main frame, and the upward and downward movement of the entire finger-beam, or of either end independent of the other, by the undulations of the ground over which it is drawn.

In a finger-beam having a hinged connection, either directly with the main frame or by an intermediate coupling arm or support, the location of the hinge or hinges is important. If the hinges are placed too low—as, for instance, on or below the plane of the cutters—they will materially interfere with the effective and free operation of the finger-beam by striking against the inequalities of the ground, and by gathering grass raise up the beam and cutters and prevent its moving close to the ground. To remedy these difficulties the inventor has so arranged the hinges that carry forward the finger-beam, that they will be above the plane of the cutters, and while the finger-beam is connected to one end of the coupling-arm and is free to rest upon the ground the other end of the arm is carried above the ground and free of obstructions, and this constitutes the nature of this part of the aforesaid invention.

It is important that the cutting apparatus should ride easily and lightly over the ground, while it should at the same time hug the ground sufficiently to prevent its bouncing upward with every slight projection. Now, the coupling-arm adds its weight to the cutting apparatus, and would without some counteracting force cause the beam to ride too heavily on the ground.

To counteract this tendency the inventor has provided means to overcome this difficulty; and the nature of this part of the invention consists in counterpoising the cutting apparatus and coupling-arm by means of the gearing which he has located on the opposite side of the main axle from the cutting apparatus.

As a machine of this character is intended to operate on uneven ground, and being mounted on two wheels only, whose base or bearing-points exceed but little in width the width of the main frame, and as on uneven and rough ground much lateral vibration is given to the main frame on which the driver's seat is placed, which subjects the occupant of said seat to a corresponding motion, and as on rough ground also the cutters are more liable to meet with obstructions, and as such obstructions will be frequently so hid under the crop that the operator, however favorable his position, will not discover the object in time to prevent the machine from striking it and producing a jar or shock that may throw him from his seat, and if so located as to fall before the cutters he will be in great danger of serious injury.

To guard against the danger of being injured by being thrown before the cutters, and at the same time give the driver a good position to watch the operation of the cutters, and guard as much as possible against collisions with intervening obstacles, is the object of this part of the invention; and it consists in combining with a main frame mounted on two independent driving and supporting wheels, and a hinged cutting apparatus connected with said main frame, a seat mounted on the main frame, and so located that the cutting apparatus will travel in advance of the position of the driver.

To enable others skilled in the art to make and apply this invention, I will proceed to describe the same in connection with the accompanying drawings.

A A are two main driving and supporting wheels of the same size, and loosely affixed on the opposite ends of the axle B, which is connected to the main frame C by suitable bearings or boxes in which it turns. The main frame is supported and carried by this axle B and the main wheels A A, and said frame is of rectangular form and suspended between said main wheels, and nearly balanced on the axle B, on which it can freely oscillate.

To the main axle B, on each side of the main frame, and between it and the driving-wheels, are rigidly affixed ratchet-wheels D, having notches or teeth in their peripheries.

To the inner sides of the main wheels A A are connected webs or projections E, which carry dogs or pawls F, which are so set as to take into the notches of the ratchet-wheels D when the machine is moved forward, and slip over the notches when the machine is backed. Each dog or pawl has a spring, G, which presses upon them with sufficient force to insure at all times their taking into the notches of the ratchet when the machine is advanced, and with sufficient elasticity to yield and let the pawls slip over the notches when the machine is backed.

To the main axle B is firmly fastened a main gear-wheel, H, which revolves with the shaft. With this gear H a pinion, I, on the shaft J meshes, the shaft J having suitable bearings on the main frame in which it can turn.

On the outer end of the shaft J is rigidly affixed a gear-wheel, K, which works into the pinion L on the shaft M, which has also suitable bearings or supports on the main frame, in which it can freely turn.

To the outer end of the shaft M is affixed a balance-wheel, N, having arms O, to one of which is affixed a wrist or crank pin, P, to which one end of the pitman Q is connected, the other end of said pitman being connected at R to the toggle levers or links S T. One end of the link S is pivoted to the lower end of the down-hanger U, which is fastened at its upper end to the rear left-hand corner of the main frame C. The other end of the link S hinges to the pitman Q. The toggle link or lever T is fastened at its inner end to the pitman at R, and its opposite end has a hinged piece, V, connected with it, which pivots on the rear end of the vibrating lever W. By means of this piece V and its connection with the link or lever T and vibrating lever W two hinged connections are made at right angles to each other, and thus permitting the vibrating lever W to move in the arc of a circle, while the toggle lever or link T can move in the arc of a circle at right angles to that of the vibrating lever W, and so prevent the torsion that would occur to the vibrating lever and its connections if the toggle-link T were united to the lever W by a single hinge. The vibrating lever W at its rear end plays in a slotted guide, X, which guide is secured to the rear end of the coupling-arm Y. It is pivoted at Z to the coupling-arm Y, and has its front end pivoted at B′ to the cutter-bar C′.

The cutters are of the ordinary scalloped form, and are fastened to the bar C′ in the usual manner, and rest upon and vibrate over a series of fingers, K′, which are connected with and supported by the beam D′ in the ordinary manner. The cutters N′ receive their vibratory movement from one or both of the main wheels A A through the gearing and connections heretofore described.

To the finger-beam D′ is connected a coupling-arm, Y, which extends under the main frame, and is connected therewith by hinges E′ F′, uniting it to the down-hangers G′ H′.

This machine is designed to reap as well as to mow, and when reaping the apron and receptacle for the grain must be supported and sustained by the coupling-arm and finger-beam.

As the main frame is supported and nearly balanced on the main axle B, and is free to oscillate thereon, and that its freedom of motion may not be restrained, the inventor has connected the draft-pole J′, by means of its cross-bar L′, to the front part of the main frame *c*, by eyebolts or hinges M′ M′, so that the team connected therewith can travel beside the standing grass or grain and in the previous swath, and thus while the team by means of the draft-pole moves the machine forward and steadies it laterally its hinged connection leaves the main frame free to oscillate up and down at its front end. The power required to vibrate the cutters is exerted in a line passing through the main wheels and gearing, and tends to push down the main frame at its forward end; but the main frame and gearing, with the finger-beam and coupling-arm, are so balanced that the beams will not be forced downward in an injurious manner, but only with that force necessary to keep it on the ground when working, and prevent its bouncing upward by slight irregularities in the surface of the ground.

R′ is an adjustable sole hinged to the finger-beam D′, and S′ is a lever, the lower end of which rests on the upper side of the rear edge of the sole. The other end of this lever extends upward and backward to near the driver's seat. It has a pivoted connection with the down-hanger G′, so that the driver can, by carrying the upper end of the lever from him, force down its opposite end, and with it the heel of the sole, and thereby raise the beam and cutters; or by a reverse movement lower them.

When the machine is used for reaping grain an apron, *a*, may be used, which is hung to rollers *b b′*, which are arranged at opposite ends of a light frame-work, *c*.

*d* is a receptacle for the cut grain, and is made of a series of curved fingers, *h*. This receptacle is united to the frame *c* at the left-hand end of the apron *h*. A pulley is put upon the roller *b*, over which a band, *e*, passes for driving it and the apron. A rake, *i*, is used for reaping, having proper supports, its curved arm *j* extending up near the driver's seat, where it connects with a lever, *k*. The object of this rake is to throw off the grain gathered on the receiver *d*. To aid in bringing the grain to the cutters and onto the apron, a reel, *l*, is used, which may be driven by band *p* and pulley *q*. The cut grain falling upon the apron *a* is carried forward to the receptacle *d*. When sufficient has accumulated the operator, by placing his foot on the rake-arm *j*, near the vertical lever *k*, and pressing it down thereby, raises up the rake. Then by bringing the top of the vertical lever toward him the rake is carried over the accumulated grain. By removing his foot from the arm *j* the rake drops down behind the grain, and then by carrying the top of the lever *k* from him the rake *i* sweeps the grain from the receptacle *d* to the ground.

When the machine is used for mowing grass the apron, reel, rake, and receiver, as well as the means of operating them, are dispensed with, and may be removed.

The progressive motion of the main frame on its wheels carries forward the coupling-arm, and that in its turn carries forward the finger-beam and cutters, and as the main frame is free to oscillate on its axle the beam necessarily rests upon the surface of the ground, and as the coupling-arm which carries the beam and cutters is connected to the main frame by hinges the beam and cutters are free to assume any position that may be required by the varying inclinations of the surface of the ground. Some of these positions are shown in Fig. 5, from which it will be seen that the driving-wheels and the finger-bar may follow the undulations of the ground without influencing each other. Either end of the cutting apparatus is free to conform to the inequalities of the ground, independent of the up and down motions of either of the driving-wheels, and vice versa; and as the cutters derive their vibrating motion from either or both of the driving-wheels it follows that so long as either of the driving-wheels has a forward motion the cutters must vibrate, and whether the machine be turned to the right or to the left one of the wheels will have a forward motion and continue to drive the cutter.

The machine as described, it will be observed, has a tongue to draw, steady, and direct the machine by, and has a main frame carrying the gearing, on which main frame is fixed the driver's seat Q′, the main frame being supported by the two wheels A A, which give motion to the cutters. The finger-beam is made short, as shown in the drawings, so as to protect the cutters without extending much beyond them, and so hinged to the main frame that the upward and downward motions of its entire length or either end independent of the other will be controlled only by the undulations of the ground over which it is drawn by the main frame.

The hinges E F, by which the coupling-arm Y is connected to the main frame, and which serve to give the beam its freedom of motion and advance it over the ground, are arranged, as shown in the drawings, above the plane of the cutters, the distance above being determined by the strength of materials and the position of the point of attachment; but in no case should they be on or below the plane of the cutters.

The coupling-arm Y is so arranged as that, while it carries, properly supports, and permits the finger-beam to travel on the ground at one of its ends, the other end thereof is carried above the ground, so as to be uninfluenced by the projections on its surface, except as transmitted to it through the finger-beam.

The main axle B is the center of motion and the center of oscillation.

The main gear-wheel H is mounted on the main axle B, while the balance of the gearing is arranged on one side of said axle and the cutting apparatus on the opposite side thereof, thus causing the gearing to counterbalance the cutting apparatus, and the tendency it would otherwise have to ride heavily on the ground.

The cutting apparatus is so connected to the main frame as to travel in advance of the driving-wheels. The seat for the driver is placed nearly over the main axle, so that he can, if desirable, throw a portion of his weight forward of the center of motion, and, riding behind the cutting apparatus and team, his position is such that he can guide and direct the team, watch the operation of the cutters, guard against obstructions, and at the same time be safe from the danger of being thrown upon or before the cutters.

What is claimed in this patent as the invention of the said ROBERT T. OSGOOD is—

1. The combination, with the main frame, of two independent driving-wheels and a hinged cutting apparatus, whereby the cutters are kept in operation when the machine is turned either to the right or left, and the cutting apparatus, or either end thereof, is free to conform to the inequalities of the ground, independent of the up and down motions of the driving-wheels, substantially as described.

2. The combination, in a mowing-machine, in the manner herein set forth, of the following elements, viz: a hinged tongue to draw and steady the machine, a frame to carry and support the driver and gearing, two independent driving and supporting wheels to carry the frame and give motion to the cutters, and a short finger-bar so hinged to the main frame that its progressive movement over the ground will be controlled by the main frame and the upward and downward movements of the entire finger-beam, or of either end thereof, independent of the other end, by the undulations of the ground over which it is drawn, substantially as described.

3. Arranging the hinges by which the finger-beam is connected to the main frame and advanced over the ground above the plane of the cutters, substantially as and for the purpose herein described.

4. In combination with the main frame and finger-beam, so arranging the coupling-arm Y that while that end carrying the beam can be brought close to so as to permit the finger-beam to travel on the ground its other end, together with the hinges, will be carried above the ground and free of obstructions, substantially as described.

5. In combination with the main frame and its supporting-wheels, the hinged cutting apparatus located on one side of the center of motion, and the gearing located on the opposite side thereof, substantially as and for the purpose set forth.

6. In combination with the main frame, mounted on two independent driving and supporting wheels, and a hinged cutting apparatus connected with said main frame, a seat for the driver so located that the cutters will travel in advance of the driver, substantially as and for the purpose set forth.

CYRENUS WHEELER, JR.

Witnesses:
L. A. PRATT,
CHAS. CAMPBELL.